US012732531B1

(12) United States Patent
Afroz et al.

(10) Patent No.: US 12,732,531 B1
(45) Date of Patent: Sep. 8, 2026

(54) SYSTEMS AND METHODS FOR TRAINING A SMART SECURITY ASSISTANT TO CREATE A DIALOGUE TREE LEADING TO SOLUTIONS TO SECURITY PROBLEMS

(71) Applicant: GEN DIGITAL INC., Tempe, AZ (US)

(72) Inventors: Sadia Afroz, New York, NY (US); Viliam Lisý, Svaty Jur (SK); Václav Belák, Havlíčkova Borová (CZ); Felix Fischer, Munich (DE); Vibhor Sehgal, San Francisco, CA (US)

(73) Assignee: Gen Digital Inc., Tempe, AZ (US)

( * ) Notice: Subject to any disclaimer, the term of this patent is extended or adjusted under 35 U.S.C. 154(b) by 164 days.

(21) Appl. No.: 18/426,158

(22) Filed: Jan. 29, 2024

Related U.S. Application Data

(60) Provisional application No. 63/467,553, filed on May 18, 2023.

(51) Int. Cl.
*H04L 9/40* (2022.01)
*G06Q 30/015* (2023.01)

(52) U.S. Cl.
CPC ....... *H04L 63/1441* (2013.01); *G06Q 30/015* (2023.01)

(58) Field of Classification Search
CPC .......................... H04L 63/1441; G06Q 30/015
USPC ........................................................... 726/23
See application file for complete search history.

(56) References Cited

U.S. PATENT DOCUMENTS

2021/0273961 A1* 9/2021 Humphrey .......... H04L 63/1433
2022/0046047 A1* 2/2022 Lewis .................. G06F 21/554
2022/0224716 A1* 7/2022 Salji .................... H04L 63/1441
2024/0080323 A1* 3/2024 Balmakhtar ............ H04L 41/16
2024/0163254 A1* 5/2024 Agiv .................. H04L 63/1433
2024/0221733 A1* 7/2024 King .................. G10L 21/0208
2024/0372880 A1* 11/2024 Bansal ................ H04L 63/1416

* cited by examiner

*Primary Examiner* — Lan Dai T Truong
(74) *Attorney, Agent, or Firm* — ALG Intellectual Property, LLC

(57) ABSTRACT

A computer-implemented method for training a smart security assistant to create a dialogue tree leading to solutions to security problems may include (i) detecting a request for performing a security task, (ii) identifying potential security threats associated with the request, and (iii) performing a security action that matches a solution to the potential security threats. Various other methods, systems, and computer-readable media are also disclosed.

20 Claims, 6 Drawing Sheets

SYSTEMS AND METHODS FOR TRAINING A SMART SECURITY ASSISTANT TO CREATE A DIALOGUE TREE LEADING TO SOLUTIONS TO SECURITY PROBLEMS

CROSS REFERENCE TO RELATED APPLICATION

This application claims the benefit under 35 U.S.C. § 119(e) of U.S. Provisional Patent Application Ser. No. 63/467,553, filed May 18, 2023, the disclosure of which is hereby incorporated herein, in its entirety, by this reference.

BACKGROUND

Chatbots are often known for going off-script and producing inaccurate or objectionable content. For certain chatbots (such as those performing security tasks), the accuracy and reliability of answers to security questions may be vital for protecting against various threats. Traditional approaches for ensuring reliable answers by chatbots may often include, in part, strictly prescribing a small collection of tasks that a chatbot is designed to handle with respect to specific questions and preventing improvised responses to any other questions. These traditional approaches, however, are often overly limiting as they fail to identify many common user requests for providing responses not included in the aforementioned prescribed collection of tasks.

SUMMARY

As will be described in greater detail below, the present disclosure describes various systems and methods for training a smart security assistant to create a dialogue tree leading to solutions to security problems.

In one example, a method for training a smart security assistant to create a dialogue tree leading to solutions to security problems may include (i) detecting, by one or more computing devices, a request for performing a security task, (ii) identifying, by the one or more computing devices, one or more potential security threats associated with the request, and (iii) performing, by the one or more computing devices, a security action that matches a solution to the one or more potential security threats.

In some examples, the request for performing the security task may be detected by receiving a description of a security event in a communication session initiated by a user. Additionally or alternatively, the request for performing the security task may be detected by monitoring one or more user client devices to recognize a security event.

In some examples, the potential security threats may be identified by (i) generating a dialogue tree including a group of issue nodes representing a set of known security events with corresponding solutions and a set of unknown security events without corresponding solutions and (ii) identifying the potential security threats based on the issue nodes. In some examples, the dialogue tree may be generated by adding a group of intermediate nodes representing clarifying questions for identifying the corresponding solutions for the set of known security events. In some examples, the group of issue nodes may be generated from (i) customer support chat sessions identifying previously answered security event queries and solutions, (ii) customer support chat sessions identifying previously unanswered security event queries, (iii) online forums identifying answers to common security event queries, and/or (iv) knowledge base articles including solutions to the common security event queries.

In some examples, the security action may be performed by matching one or more knowledge base articles to the potential security threats. Additionally or alternatively, the security action may be performed by matching one or more online forums answers to the potential security threats. Additionally or alternatively, the security action may be performed by matching a set of customer support database solutions to the potential security threats. Additionally or alternatively, the security action may perform a security evaluation task associated with the one or more potential security threats.

In one embodiment, a system for training a smart security assistant to create a dialogue tree leading to solutions to security problems may include at least one physical processor and physical memory comprising computer-executable instructions and one or more modules that, when executed by the physical processor, cause the physical processor to (i) detect, by a detection module, a request for performing a security task, (ii) identify, by a graph module, one or more potential security threats associated with the request, and (iii) perform, by a security module, a security action that matches a solution to the one or more potential security threats.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect a request for performing a security task, (ii) identify one or more potential security threats associated with the request, and (iii) perform a security action that matches a solution to the one or more potential security threats.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
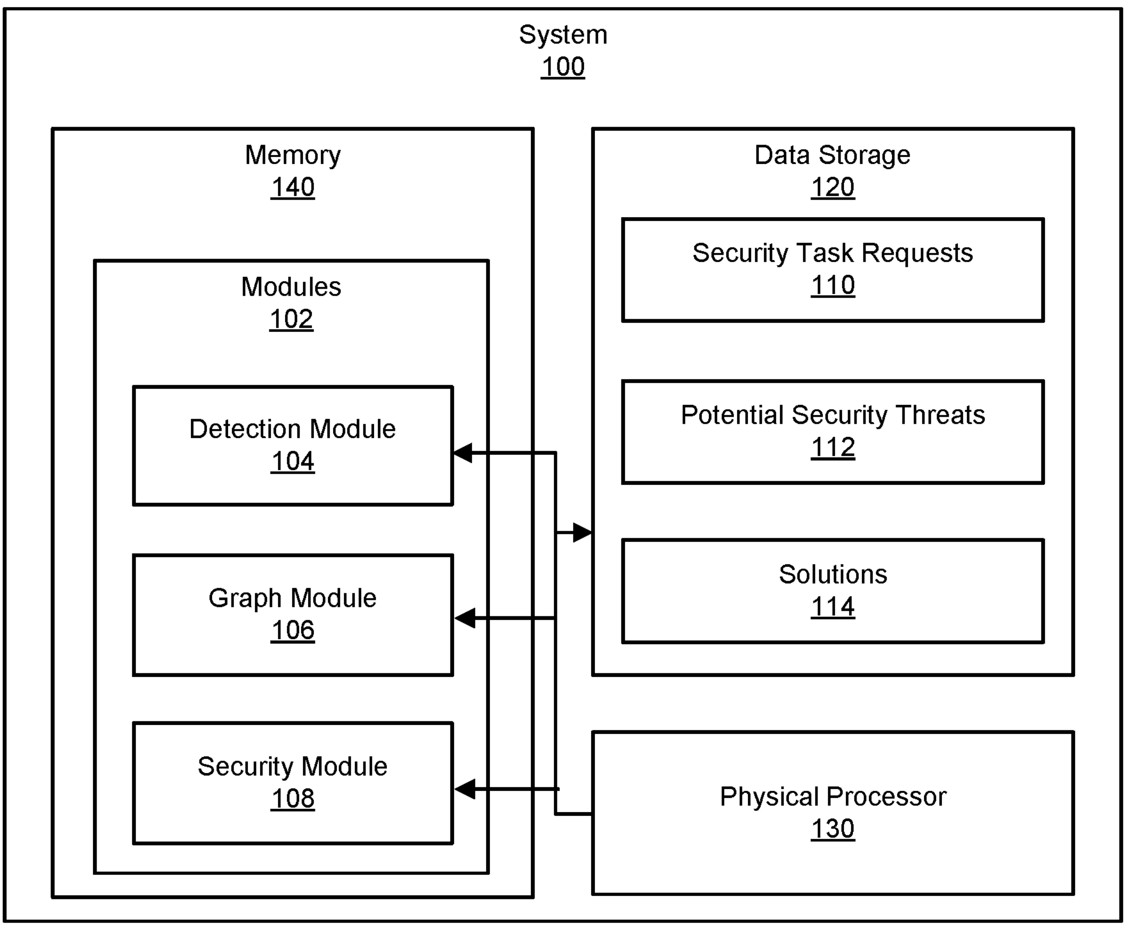
FIG. 1 is a block diagram of an example system for training a smart security assistant to create a dialogue tree leading to solutions to security problems.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for training a smart security assistant to create a dialogue tree leading to solutions to security problems. As will be described in greater detail below, the systems and methods described herein may automate various security tasks and further provide an interactive communication system for users to resolve various security issues, thereby removing the burden of these issues from users. In automating security tasks and resolving security issues, the systems and methods described herein may utilize a reactive mode (where users may describe various security issues in natural language and the smart security assistant (e.g., a chatbot) may utilize conversational AI to understand user issues and carry out appropriate actions while explaining the outcome to the users) and a proactive mode (where users may establish automated monitoring, detection, and repair of selected security-related issues on client devices, in accounts, and other components forming a user's digital footprint). The systems and methods described herein may also build a graph (i.e., a dialogue tree) drawn from customer support chat sessions, forums, knowledge base articles consisting of issue nodes corresponding to known and unknown user issues and then map these issues to solutions. Finally, the systems and methods described herein may map conversation paths from dialogue tree nodes to the issues by adding nodes to assist the smart security assistant to obtain information for identifying a particular issue.

Moreover, the systems and methods described herein may improve the technical fields of computer device security and/or data privacy by protecting against malware attacks, scams, or other attacks initiated by threat actors to facilitate the unintentional disclosure of sensitive/private user data for malicious purposes. Additionally, the systems and methods described herein may improve computer device security and/or data privacy by assisting users in choosing and managing secure passwords, analyzing privacy policies for vulnerabilities, providing ad blocking and disguising fingerprints, etc.

Figure 2:
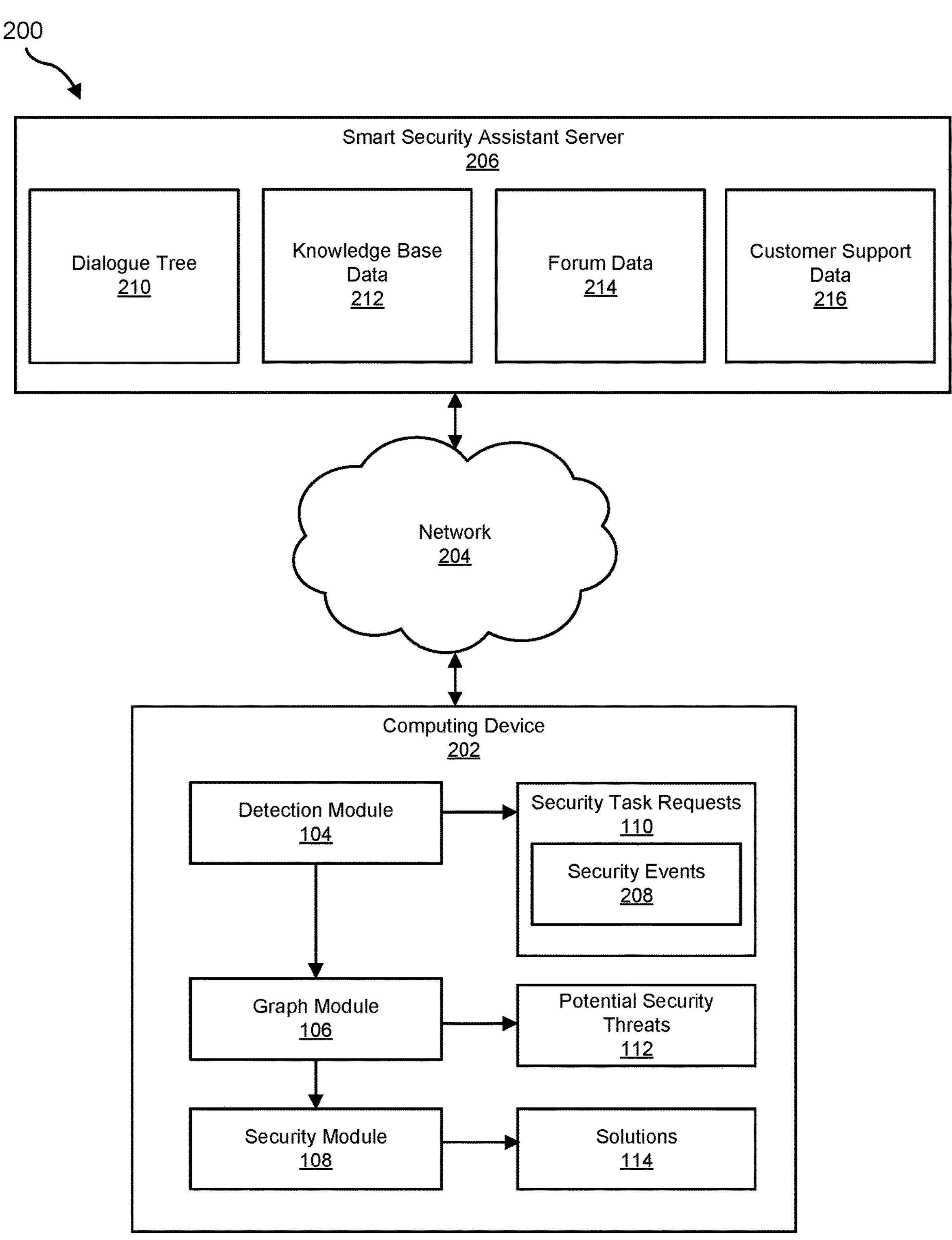
FIG. 2 is a block diagram of an additional example system for training a smart security assistant to create a dialogue tree leading to solutions to security problems.

The following will provide, with reference to FIGS. 1-2, detailed descriptions of example systems for training a smart security assistant to create a dialogue tree leading to solutions to security problems. Detailed descriptions of corresponding computer-implemented methods will also be provided in connection with FIG. 3. In addition, a detailed description of an example an example dialogue tree that may be created by the example systems of FIGS. 1 and 2 will also be provide in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for training a smart security assistant to create a dialogue tree leading to solutions to security problems. As illustrated in this figure, example system 100 may include one or more modules 102 for performing one or more tasks. For example, and as will be explained in greater detail below, example system 100 may include a detection module 104 that detects security task requests 110. Example system 100 may additionally include a graph module 106 that identifies potential security threats 112 associated with security task requests 110. Example system 100 may also include a security module 108 that performs a security action that matches solutions 114 to potential security threats 112. Although illustrated as separate elements, one or more of modules 102 in FIG. 1 may represent portions of a single module or application.

The term "security task requests" as used herein, may generally refer to a set of questions and/or responses on a particular topic submitted by a user during a communication session hosted by a software application configured to mimic human conversations through text and/or voice interactions (e.g., conversations), such as a chatbot. For example, a security task request may include questions regarding potential computing device security threats or concerns submitted by a user to a mixed chatbot and security agent software application configured to provide simulated human responses. The potential computing device security threats or concerns may be expressed as queries regarding uncertainty about e-mail content, safety of a webpage, uncertainty about a current security posture of a computing device or an application in-use, installing new security applications, etc.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or smart security assistant server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate training a smart security assistant to create a dialogue tree leading to solutions to security problems. Examples of physical processor 130 include, without limitation, microprocessors, microcontrollers, Central Processing Units (CPUs), Field-Programmable Gate Arrays (FP- GAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In some examples, data storage 120 may store security task requests 110, potential security threats 112, and solutions 114.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with smart security assistant server 206 via a network 204. In one example, all or a portion of the functionality of modules 102 may be performed by computing device 202, smart security assistant server 206, and/or any other suitable computing system. As will be described in greater detail below, one or more of modules 102 from FIG. 1 may, when executed by at least one processor of computing device 202 and/or smart security assistant server 206, enable computing device 202 and/or smart security assistant server 206 to train a smart security assistant to create a dialogue tree leading to solutions to security problems. For example, and as will be described in greater detail below, detection module 104, graph module 106, and security module 108 may cause computing device 202 and/or smart security assistant server 206 to (i) detect security task requests 110 (including security events 208), (ii) identify potential security threats 112 associated with security task requests 110 (e.g., by building dialogue tree 210), and perform a security action that matches solutions 114 (e.g., security threat solutions obtained from utilizing knowledge base data 212, forum data 214 and/or customer support data 216) with potential security threats 112.

Computing device 202 generally represents any type or form of computing device capable of reading computer-executable instructions. In some examples, computing device 202 may be an endpoint device running client-side security software, such as a client smart security assistant application configured to identify potential security threats (e.g., spam threats) for user messages and visited websites. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Smart security assistant server 206 generally represents any type or form of computing device that is capable of executing and/or reading computer-executable instructions. In some examples, smart security assistant server 206 may be a backend security server configured to provide a chatbot service for identifying potential security threats for user client devices. Additional examples of smart security assistant server 206 include, without limitation, application servers, web servers, storage servers, and/or database servers configured to run certain software applications and/or provide various web, storage, and/or database services. Although illustrated as a single entity in FIG. 2, smart security assistant server 206 may include and/or represent a plurality of servers that work and/or operate in conjunction with one another.

Network 204 generally represents any medium or architecture capable of facilitating communication or data transfer. In one example, network 204 may facilitate communication between computing device 202 and smart security assistant server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
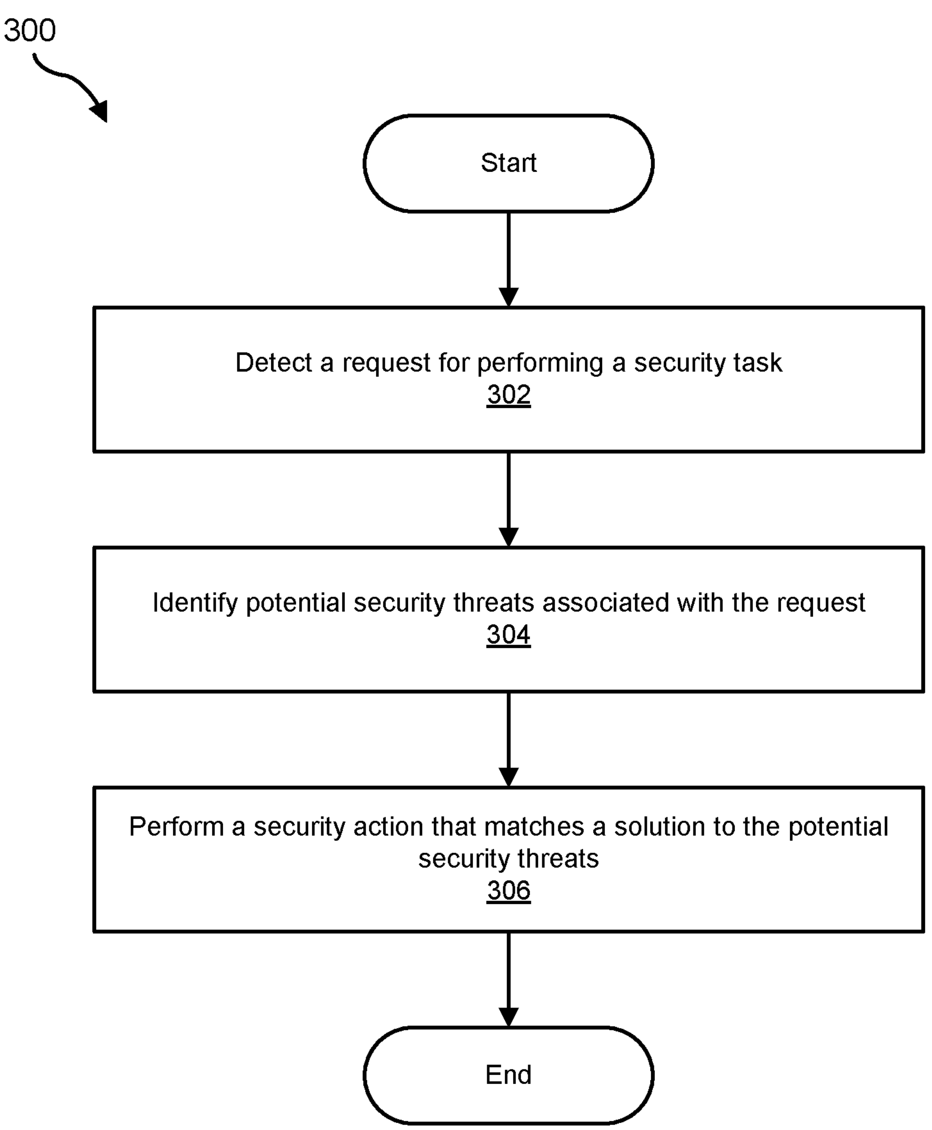
FIG. 3 is a flow diagram of an example method for training a smart security assistant to create a dialogue tree leading to solutions to security problems.

FIG. 3 is a flow diagram of an example computer-implemented methods 300 for training a smart security assistant to create a dialogue tree leading to solutions to security problems. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect a request for performing a security task. For example, detection module 104 may, as part of computing device 202 in FIG. 2, detect a security task request 110.

Detection module 104 may detect a security task request 110 in a variety of ways. In some examples, detection module 104 may be configured to operate in a reactive mode by receiving a description of a security event 208 in a communication session initiated by a user. The security event 208 may include actions or activities regarding a variety of security products and/or services including, without limitation, password management, application installations, privacy policy reviews, blocking advertisements (i.e., ad blocking), disguising fingerprints, web tracking, suspicious URLs (i.e., safe link/scam detection), and malware/antivirus removal and protection. In some examples, users may communicate the description of security event 208 utilizing natural language to request desired actions associated with a security task request 110. Additionally or alternatively, detection module 104 may be configured to operate in a proactive mode by monitoring user client devices to recognize a security event 208. For example, detection module 104 may be configured to automatically monitor, detect, and repair security events 208 (that may be previously selected by a user) on user client devices, online accounts, and/or other digital media/content. In some examples, detection module 104, in detecting security task requests 110, may be configured to utilize conversational artificial intelligence (AI) for understanding user security issues, the context where it occurred, and communicate with users.

At step 304, one or more of the systems described herein may identify potential security threats associated with the request for performing the security task detected at step 302. For example, graph module 106 may, as part of computing device 202 in FIG. 2, identify potential security threats 112 associated with a security task request 110.

Graph module 106 may identify potential security threats 112 in a variety of ways. In some examples, graph module 106 may generate dialogue tree 210 to identify potential security threats 112 including a group of issue nodes representing a set of known security events with corresponding solutions and a set of unknown security events without corresponding solutions. Then, graph module 106 may identify potential security threats 112 based on the issue nodes. In some examples, the group of issue nodes may be generated from customer support data 216 which may include (i) customer support chat sessions identifying previously answered (i.e., solved) security event queries and solutions as well as customer support chat sessions identifying previously unanswered (unsolved) security event queries, (ii) forum data 214 which may include data from online forums identifying answers to common security event queries, and/or (iii) knowledge base data 212 which may include knowledge base articles having solutions to common security event queries.

Figure 4:
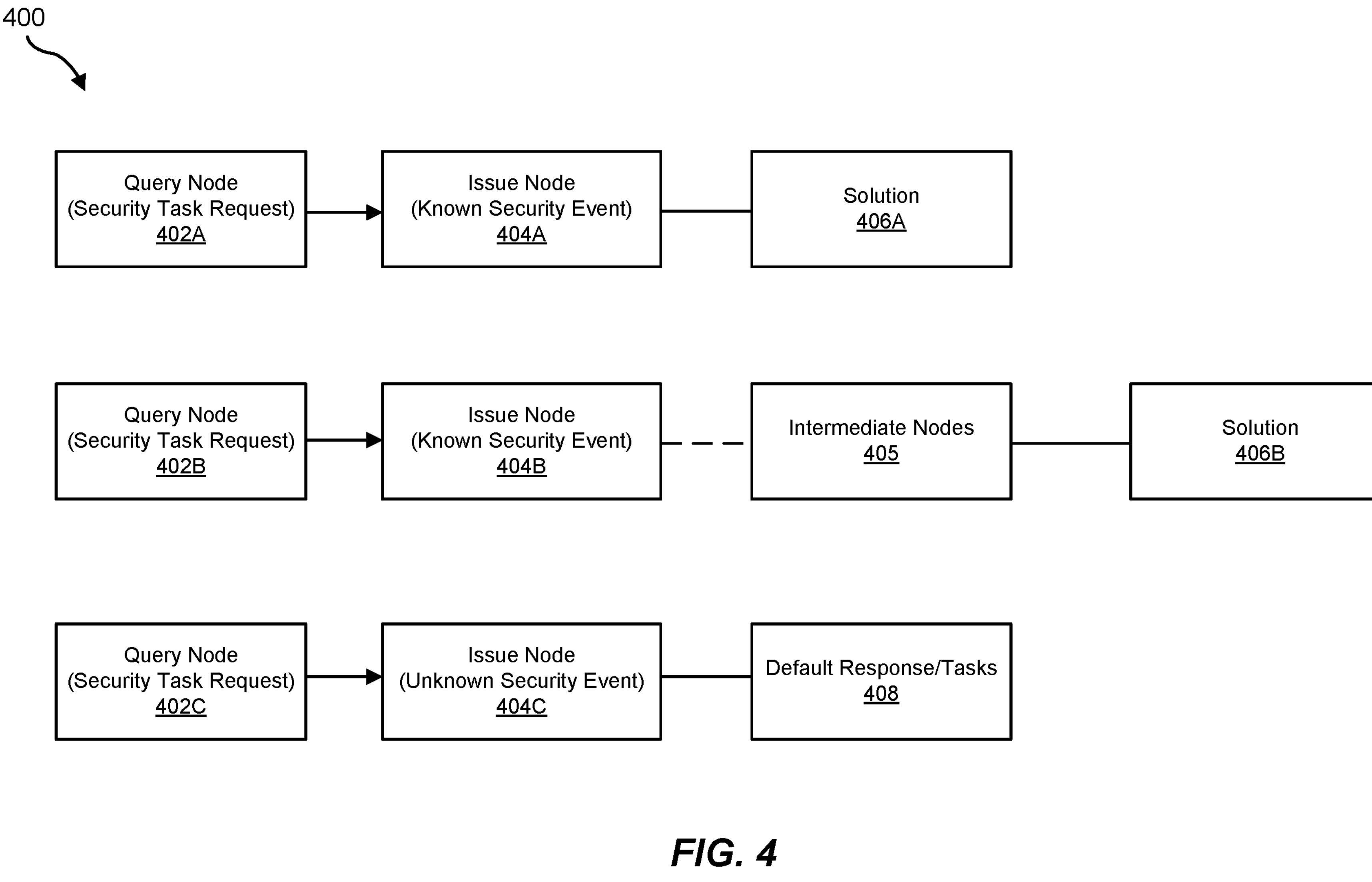
FIG. 4 is a block diagram of an example dialogue tree that may be created by the example systems of FIGS. 1 and 2.

For example, and turning now to FIG. 4, a dialogue tree 400, which may be generated by graph module 106, includes branches including a group of query nodes 402A, 402B, and 402C representing various security task requests 110, a group of issue nodes 404A (representing a known security event), 404B (representing another known security event), and 404C (representing an unknown security event), and solutions 406A and 406B (representing answers to security task requests for query nodes 402A and 402B, respectively). In some examples, dialogue tree 400 may optionally include a set of intermediate nodes 405 (representing clarifying questions associated with the security task request for query node 402B). For example, if a security task request for query node 402B includes a user query asking "Please help me install my VPN app," an intermediate node 405 may be generated for obtaining additional information such as requesting the user's device operating system, whether the user is a subscriber to a provider VPN product, and/or other details in order to be able to refer the user to an appropriate solution (e.g., solution 406B).

In some examples, for security task requests associated with unknown security events (e.g., issue node 404C) without any corresponding solutions, dialogue tree 400 may generate a default responses/tasks node 408 for addressing these types of requests. For example, default responses/tasks node 408 may include invoking a customer support specialist, collecting data, and/or determining that an issue associated with the request is out of scope.

Returning now to FIG. 3, at step 306, one or more of the systems described herein may perform a security action that matches a solution to the potential security threats. For example, security module 108 may, as part of computing device 202 in FIG. 2, may perform a security action that matches a solution 114 to potential security threats 112.

Security module 108 may perform the security action in a variety of ways. In some examples, security module 108 may match knowledge base data 212 (i.e., knowledge base articles) to a potential security threat 112. Additionally or alternatively, security module 108 may match one or more online forum answers (i.e., forum data 214) to a potential security threat 112. Additionally or alternatively, security module 108 may match a set of customer support database solutions (i.e., customer support data 216) to a potential security threat 112. Additionally or alternatively, security module 108 may perform a security evaluation task (e.g., for security task requests 110 having unknown solutions) associated with a potential security threat 112.

As explained above in connection with example method 300 in FIG. 3, the systems and methods described herein may provide for training a smart security assistant to create a dialogue tree leading to solutions to security problems. As will be described in greater detail below, the systems and methods described herein may automate various security tasks and further provide an interactive communication system for users to resolve various security issues, thereby removing the burden of these issues from users. In automating security tasks and resolving security issues, the systems and methods described herein may utilize a reactive mode (where users may describe various security issues in natural language and the smart security assistant (e.g., a chatbot) may utilize conversational AI to understand user issues and carry out appropriate actions while explaining the outcome to the users) and a proactive mode (where users may establish automated monitoring, detection, and repair of selected security-related issues on client devices, in accounts, and other components forming a user's digital footprint). The systems and methods described herein may also build a graph (i.e., a dialogue tree) drawn from customer support chat sessions, forums, knowledge base articles consisting of issue nodes corresponding to known and unknown user issues and then map these issues to solutions. Finally, the systems and methods described herein may map conversation paths from dialogue tree nodes to the issues by adding nodes to assist the smart security assistant to obtain information for identifying a particular issue.

Figure 5:
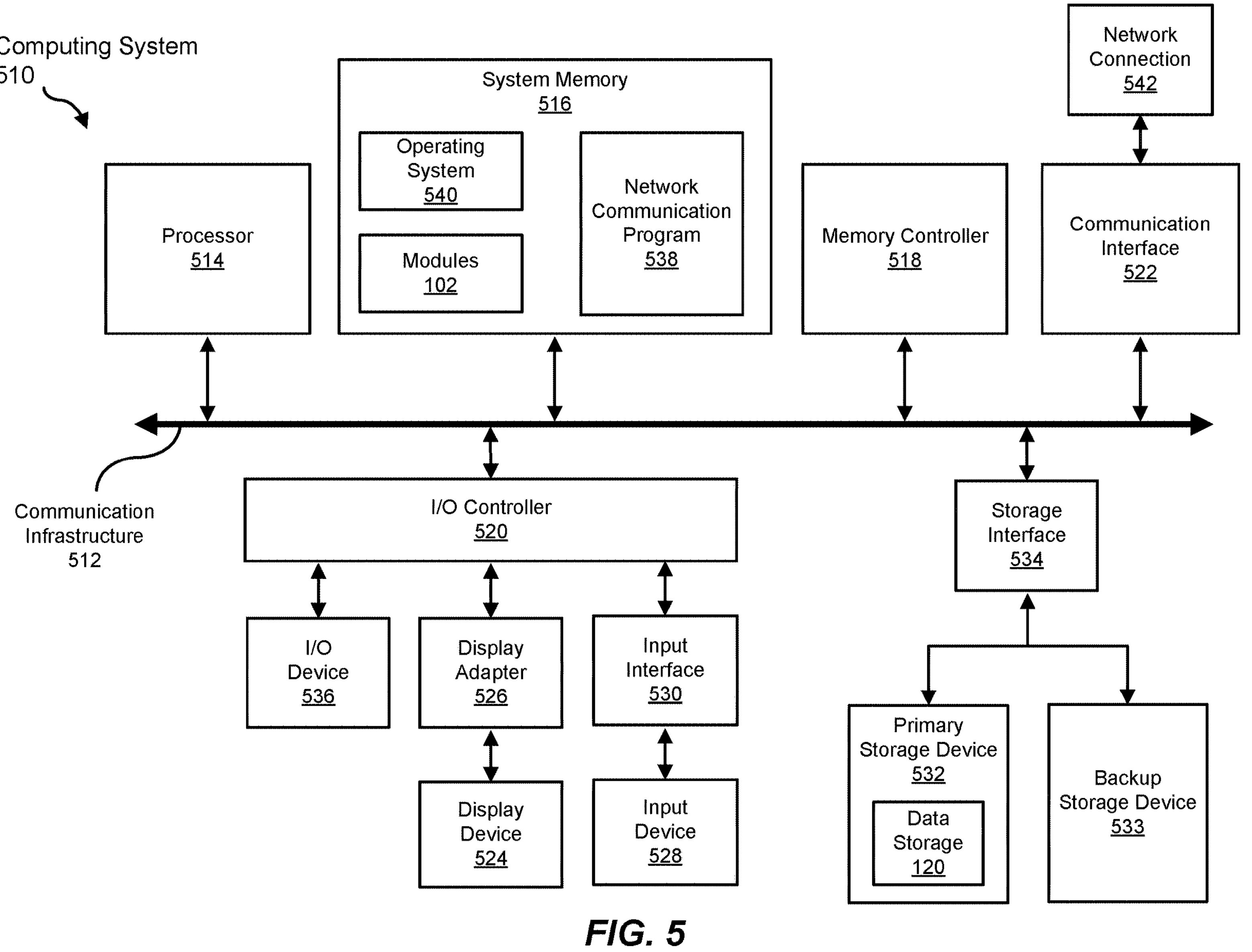
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, data storage 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
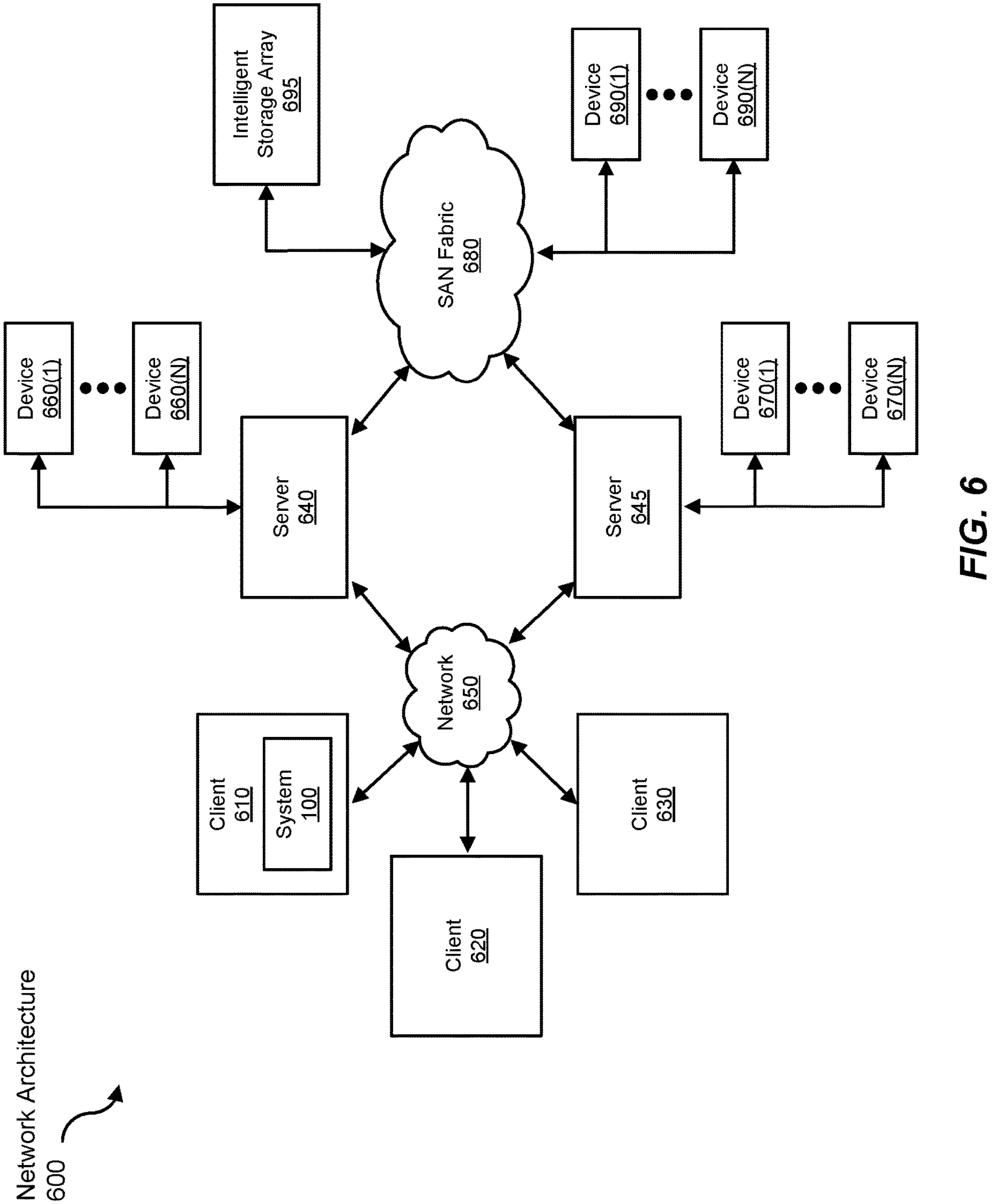
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for training a smart security assistant to create a dialogue tree leading to solutions to security problems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising".

What is claimed is:

1. A computer-implemented method for training a smart security assistant to create a dialogue tree leading to solutions to security problems, at least a portion of the method being performed by one or more computing devices comprising at least one processor, the method comprising:

establish, by the one or more computing devices with a user, a communication session initiated by the user;

receiving, by the one or more computing devices from the user in the communication session, a request for performing a security task that includes a description of a security event;

generating a dialogue tree comprising a plurality of issue nodes representing a set of known security events with corresponding solutions and a set of unknown security events without corresponding solutions;

identifying, by the one or more computing devices based on the issue nodes, one or more potential security threats associated with the request; and performing, by the one or more computing devices, a security action that matches a solution to the one or more potential security threats.

2. The computer-implemented method of claim 1, wherein the description of the security event is received in natural language.

3. The computer-implemented method of claim 1, wherein detecting the request for performing the security task comprises monitoring one or more user client devices to recognize a security event.

4. The computer-implemented method of claim 1, wherein generating the dialogue tree comprises adding a plurality of intermediate nodes representing clarifying questions for identifying the corresponding solutions for the set of known security events.

5. The computer-implemented method of claim 1, wherein the dialogue tree comprising the nodes representing the set of known security events with corresponding solutions and the set of unknown security events without corresponding solutions, is generated from at least one of:

customer support chat sessions identifying previously answered security event queries and solutions;

customer support chat sessions identifying previously unanswered security event queries;

online forums identifying answers to common security event queries; and knowledge base articles comprising solutions to the common security event queries.

6. The computer-implemented method of claim 1, wherein performing the security action that matches a solution to the one or more potential security threats comprises matching one or more knowledge base articles to the potential security threats.

7. The computer-implemented method of claim 1, wherein performing the security action that matches a solution to the one or more potential security threats comprises matching one or more online forum answers to the potential security threats.

8. The computer-implemented method of claim 1, wherein performing the security action that matches a solution to the one or more potential security threats comprises matching a set of customer support database solutions to the potential security threats.

9. The computer-implemented method of claim 1, wherein performing the security action that matches a solution to the one or more potential security threats comprises performing a security evaluation task associated with the one or more potential security threats.

10. A system for training a smart security assistant to create a dialogue tree leading to solutions to security problems, the system comprising:

at least one physical processor;

physical memory comprising computer-executable instructions and one or more modules that, when executed by the physical processor, cause the physical processor to:

establish, by a detection module with a user, a communication session initiated by the user;

receive, by the detection module from the user in the communication session, a request for performing a security task that includes a description of a security event;

generating a dialogue tree comprising a plurality of issue nodes representing a set of known security events with corresponding solutions and a set of unknown security events without corresponding solutions;

identify, by a graph module based on the issue nodes, one or more potential security threats associated with the request; and perform, by a security module, a security action that matches a solution to the one or more potential security threats.

11. The system of claim 10, wherein the description of the security event is received in natural language.

12. The system of claim 10, wherein the detection module detects the request for performing the security task by monitoring one or more user client devices to recognize a security event.

13. The system of claim 10, wherein the graph module generates the dialogue tree by adding a plurality of intermediate nodes representing clarifying questions for identifying the corresponding solutions for the set of known security events.

14. The system of claim 10, wherein the dialogue tree comprising the nodes representing the set of known security events with corresponding solutions and the set of unknown security events without corresponding solutions, is generated from at least one of:

customer support chat sessions identifying previously answered security event queries and solutions;

customer support chat sessions identifying previously unanswered security event queries;

online forums identifying answers to common security event queries; and knowledge base articles comprising solutions to the common security event queries.

15. The system of claim 10, wherein the security module performs the security action that matches a solution to the one or more potential security threats by matching one or more knowledge base articles to the potential security threats.

16. The system of claim 10, wherein the security module performs the security action that matches a solution to the one or more potential security threats by matching one or more online forums answer to the potential security threats.

17. The system of claim 10, wherein the security module performs the security action that matches a solution to the one or more potential security threats by matching a set of customer support database solutions to the potential security threats.

18. A non-transitory computer-readable medium comprising one or more computer-executable instructions that, when executed by at least one processor of a computing device, cause the computing device to:

establish, with a user, a communication session initiated by the user;

receive, from the user in the communication session, a request for performing a security task that includes a description of a security event;

generating a dialogue tree comprising a plurality of issue nodes representing a set of known security events with corresponding solutions and a set of unknown security events without corresponding solutions;

identify, based on the issue nodes, one or more potential security threats associated with the request; and perform a security action that matches a solution to the one or more potential security threats.

19. The non-transitory computer-readable medium of claim 18, wherein generating the dialogue tree comprises adding a plurality of intermediate nodes representing clarifying questions for identifying the corresponding solutions for the set of known security events.

20. The non-transitory computer-readable medium of claim 18, wherein the dialogue tree comprising the nodes representing the set of known security events with corresponding solutions and the set of unknown security events without corresponding solutions, is generated from at least one of:

customer support chat sessions identifying previously answered security event queries and solutions;

customer support chat sessions identifying previously unanswered security event queries;

online forums identifying answers to common security event queries; and knowledge base articles comprising solutions to the common security event queries.

* * * * *